United States Patent
Wang et al.

(10) Patent No.: US 11,164,278 B2
(45) Date of Patent: *Nov. 2, 2021

(54) SCREEN CAPTURE METHOD, TERMINAL, AND STORAGE MEDIUM EMPLOYING BOTH PARENT APPLICATION PROGRAM AND SUB-APPLICATION PROGRAM

(71) Applicant: TENCENT TECHNOLOGY (SHENZHEN) COMPANY LIMITED, Shenzhen (CN)

(72) Inventors: Zhaowei Wang, Shenzhen (CN); Yifu Wang, Shenzhen (CN); Kai Li, Shenzhen (CN); Zongzhuo Wu, Shenzhen (CN); Shangtao Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,406

(22) Filed: Jan. 12, 2021

(65) Prior Publication Data
US 2021/0133909 A1    May 6, 2021

Related U.S. Application Data

(63) Continuation of application No. 16/410,103, filed on May 13, 2019, now Pat. No. 10,929,942, which is a (Continued)

(30) Foreign Application Priority Data

Jan. 6, 2017    (CN) .......................... 201710011281.4

(51) Int. Cl.
*G06T 1/00*    (2006.01)
*G06F 3/0481*    (2013.01)
(Continued)

(52) U.S. Cl.
CPC .......... *G06T 1/0007* (2013.01); *G06F 3/0481* (2013.01); *G06F 3/0484* (2013.01);
(Continued)

(58) Field of Classification Search
CPC ... G06T 1/0007; G06T 2200/24; H04L 51/10; G06F 3/0481; G06F 3/0485; G06F 3/0484; G06F 9/543; G06F 3/04845
See application file for complete search history.

(56) References Cited

U.S. PATENT DOCUMENTS 9,342,273 B1    5/2016    Kumar et al.
10,466,878 B2    11/2019    Huang et al.
(Continued)

FOREIGN PATENT DOCUMENTS

CN    103927178 A    7/2014
CN    104035929 A    9/2014
(Continued)

OTHER PUBLICATIONS

The World Intellectual Property Organization (WIPO) International Search Report for PCT/CN2017/118202 dated Mar. 27, 2018 5 Pages (including translation).

*Primary Examiner* — Nicholas Ulrich
(74) *Attorney, Agent, or Firm* — Anova Law Group, PLLC

(57) ABSTRACT

A screen capture method includes the following steps: obtaining a screenshot instruction for a target page; obtaining, according to the screenshot instruction, a screenshot of an area currently displayed on the target page; covering the area currently displayed on the target page with the screenshot for display; changing an area covered by the screenshot on the target page to a designated area on the target page; obtaining a screenshot of the designated area; and restoring the target page to the area displayed before the target page is changed to the designated area.

19 Claims, 6 Drawing Sheets

Related U.S. Application Data continuation of application No. PCT/CN2017/118202, filed on Dec. 25, 2017.

(51) Int. Cl.
*G06F 3/0484* (2013.01)
*G06F 9/54* (2006.01)
*G06F 3/0485* (2013.01)
*H04L 12/58* (2006.01)

(52) U.S. Cl.
CPC ........ *G06F 3/0485* (2013.01); *G06F 3/04845* (2013.01); *G06F 9/543* (2013.01); *H04L 51/10* (2013.01); *G06T 2200/24* (2013.01)

(56) References Cited

U.S. PATENT DOCUMENTS

| | | | |
|---|---|---|---|
| 2015/0135100 A1* | 5/2015 | Bentrup | G06F 11/323 715/760 |
| 2015/0207764 A1 | 7/2015 | He et al. | |
| 2015/0234573 A1 | 8/2015 | Filippov et al. | |
| 2017/0093780 A1 | 3/2017 | Lieb et al. | |
| 2017/0102966 A1 | 4/2017 | Dallala et al. | |
| 2018/0046341 A1 | 2/2018 | Lee et al. | |
| 2018/0121469 A1 | 5/2018 | Gadepalli et al. | |

FOREIGN PATENT DOCUMENTS

| | | | |
|---|---|---|---|
| CN | 104346075 A | 2/2015 | |
| CN | 106873871 A | 6/2017 | |

* cited by examiner

SCREEN CAPTURE METHOD, TERMINAL, AND STORAGE MEDIUM EMPLOYING BOTH PARENT APPLICATION PROGRAM AND SUB-APPLICATION PROGRAM

RELATED APPLICATIONS

This application is a continuation application of U.S. patent application Ser. No. 16/410,103, filed on May 13, 2019, which in turn claims priority to PCT Patent Application No. PCT/CN2017/118202, filed on Dec. 25, 2017, which in turn claims priority to Chinese Patent Application No. 2017100112814, entitled "SCREEN CAPTURE METHOD AND APPARATUS" filed on Jan. 6, 2017, all of which are incorporated by reference in their entirety.

FIELD OF TECHNOLOGY

This application relates to the field of computer technologies, especially to the field of imaging technologies, and in particular, to a screen capture method, a terminal, and a storage medium.

BACKGROUND OF THE DISCLOSURE

A screenshot is a shortcut of copying content and sharing the content. For example, when browsing a page, a user may initiate a screenshot action by using a screenshot shortcut icon to capture an image currently displayed on a display screen, to obtain a screenshot. The user can save the screenshot in a picture form, and share the screenshot as required.

However, in a current applications, an image location of the screenshot needs to be manually adjusted, and then the screenshot action is initiated in the determined screenshot location, to take the screenshot. Therefore, the current screen capture method is complex, resulting in low user efficiency.

SUMMARY

According to various embodiments provided in this application, a screen capture method, a terminal, and a storage medium are provided.

A screen capture method is provided, including the steps of obtaining, by a terminal, a screenshot instruction for a target page; obtaining, by the terminal, a screenshot of an area currently displayed on the target page according to the screenshot instruction; covering, by the terminal, the area currently displayed on the target page with the screenshot for display; changing, by the terminal, an area covered by the screenshot on the target page to a designated area on the target page; obtaining, by the terminal, a screenshot of the designated area; and restoring, by the terminal, the target page to the area displayed before the target page is changed to the designated area.

A terminal is provided, including a memory and a processor, the memory storing a computer-readable instruction, and the computer-readable instruction. When being executed by the processor, the computer-readable instructions cause the processor to perform the following steps: obtaining a screenshot instruction for a target page; obtaining, according to the screenshot instruction, a screenshot of an area currently displayed on the target page; covering the area currently displayed on the target page with the screenshot for display; changing an area covered by the screenshot on the target page to a designated area on the target page; obtaining a screenshot of the designated area; and restoring the target page to the area displayed before the target page is changed to the designated area.

One or more non-volatile storage media store a computer-readable instruction. The computer-readable instruction, when being executed by one or more processors, causing the one or more processors to perform the following steps: obtaining a screenshot instruction for a target page; obtaining, according to the screenshot instruction, a screenshot of an area currently displayed on the target page; covering the area currently displayed on the target page with the screenshot for display; changing an area covered by the screenshot on the target page to a designated area on the target page; obtaining a screenshot of the designated area; and restoring the target page to the area displayed before the target page is changed to the designated area.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
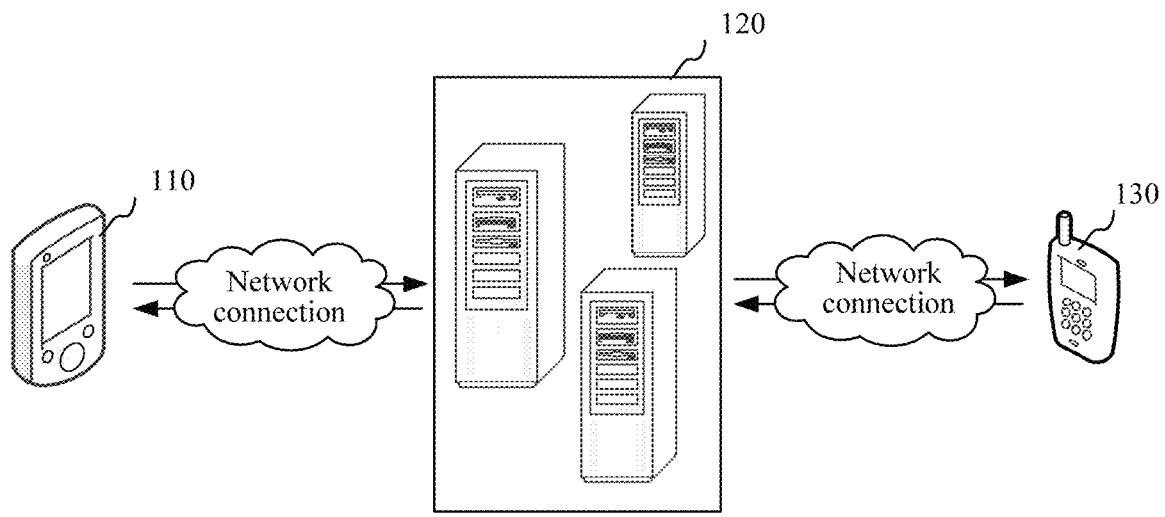
FIG. 1 is a diagram of an application environment of a screen capture method according to an embodiment of the present disclosure.

FIG. 1 is a diagram of an application environment of a screen capture method according to an embodiment of the present disclosure. Referring to FIG. 1, the screen capture method is applied to a screenshot sharing system. The screenshot sharing system includes a first terminal 110, a server 120, and a second terminal 130. Both the first terminal 110 and the second terminal 130 are connected to the server 120 through a network. "First" and "second" are used to distinguish between terminals of different individuals. The first terminal 110 and the second terminal 130 may be a same type of terminal or different types of terminals. Functions provided by the first terminal 110 and the second terminal 130 in the screen capture method may be exchangeable. The server 120 may be an independent physical server, or may be a server cluster including a plurality of physical servers.

In some embodiments, the first terminal 110 is configured to: obtain a screenshot instruction for a target page; obtain, according to the screenshot instruction, a screenshot of an area currently displayed on the target page; cover the area currently displayed on the target page with the screenshot; change an area covered by the screenshot on the target page to a designated area on the target page; obtain a screenshot of the designated area; restore the target page to the area displayed before the target page is changed to the designated area; and remove display of the screenshot displayed in the area covering the target page. The first terminal 110 may further share the screenshot of the designated area to the second terminal 130 by using the server 120.

Figure 2:
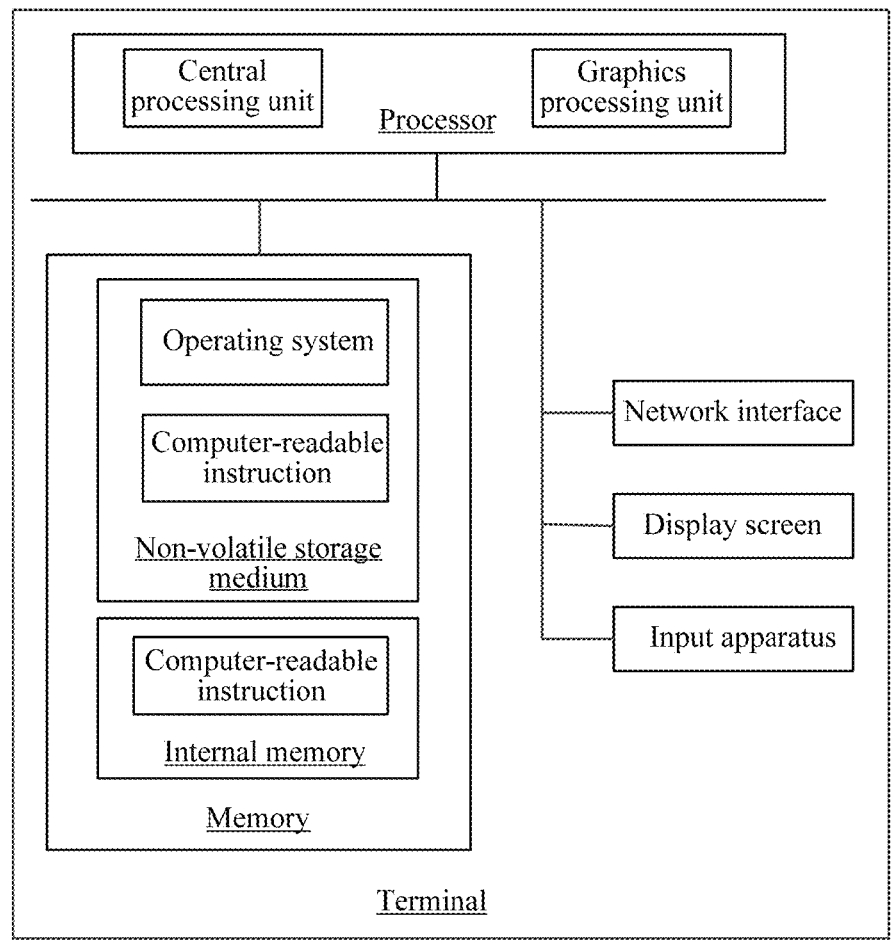
FIG. 2 is a schematic diagram of an internal structure of a terminal according to an embodiment of the present disclosure.

FIG. 2 is a schematic diagram of an internal structure of a terminal according to an embodiment of the present disclosure. The terminal may be used as the first terminal and the second terminal in FIG. 1. Referring to FIG. 2, the terminal includes a processor, a network interface, a display screen, and an input apparatus that are connected by using a system bus. The processor may include a central processing unit (CPU) and a graphics processing unit (GPU). A memory includes a non-volatile storage medium and an internal memory. A non-volatile storage medium of a computer device may store an operating system and a computer-readable instruction. When the computer-readable instruction is executed, the processor may be caused to perform a screen capture method. The processor of the terminal is configured to provide computing and control capabilities, to support running of the entire terminal. The internal memory may store the computer-readable instruction. When the computer-readable instruction is executed by the processor, the processor may be caused to perform a screen capture method. The network interface of the terminal is configured to perform network communication with a server, for example, send text content and a screenshot of a designated area, and for another example, download the screenshot of the designated area from the server. The display screen of the terminal may be a liquid crystal display screen or an e-ink display screen. The input apparatus of the terminal may be a touch layer covering the display screen, or may be a key, a track ball, or a touchpad disposed on a housing of the terminal, or may be an external keyboard, touchpad, mouse, or the like. The terminal may be a personal computer or a mobile terminal. The mobile terminal includes at least one of a mobile phone, a tablet computer, a personal digital assistant, a wearable device, or the like. A person skilled in the art may understand that the structure shown in FIG. 2 is only a block diagram of a partial structure related to a solution in this application, and does not constitute a limit to the terminal to which the solution in this application is applied.

In some embodiments, the terminal may include more or fewer components than those shown in the figure, or some components may be combined, or a different component deployment may be used.

Figure 3:
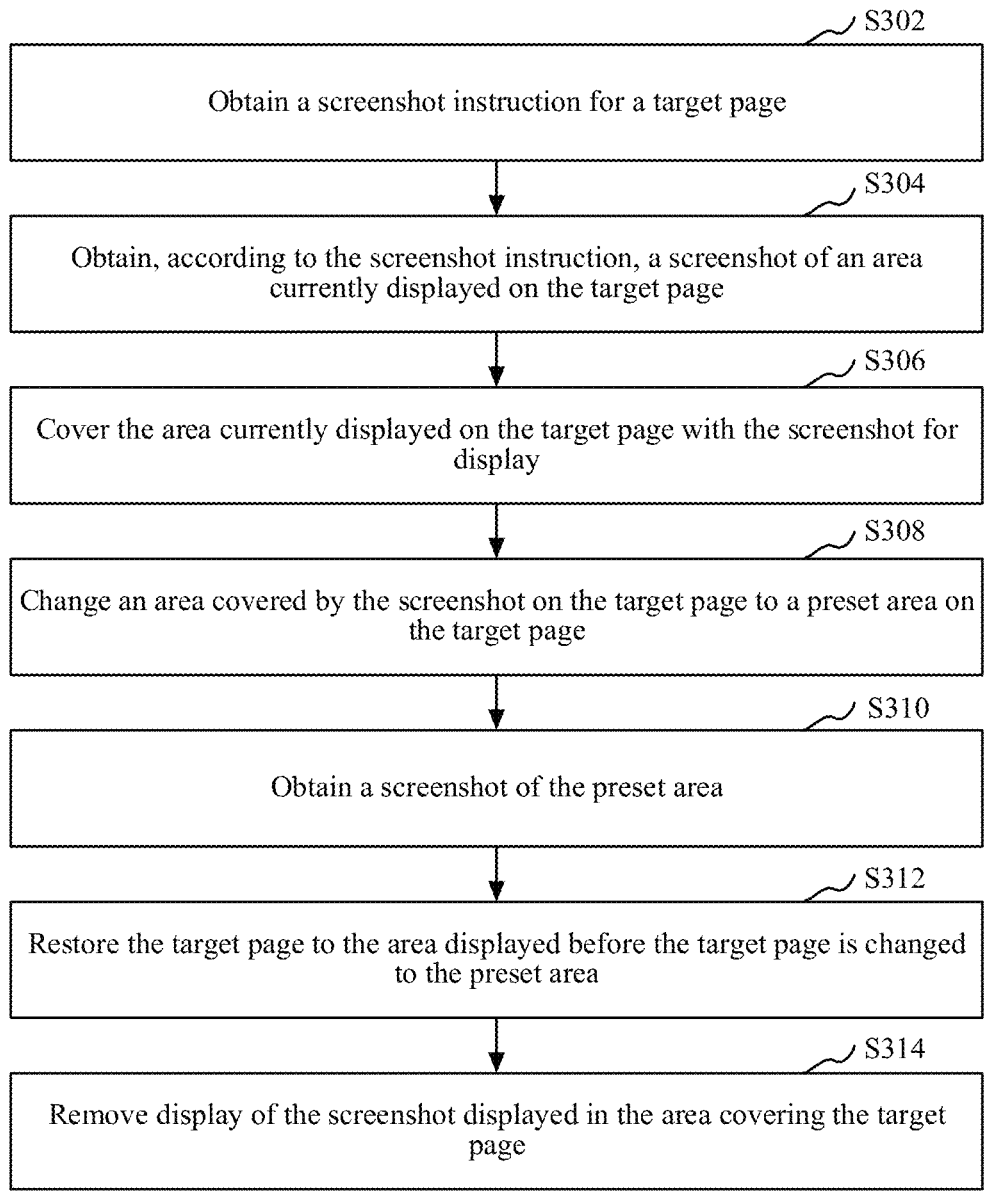
FIG. 3 is a schematic flowchart of a screen capture method according to an embodiment of the present disclosure.

FIG. 3 is a schematic flowchart of a screen capture method according to an embodiment of the disclosure. This embodiment is mainly described by using an example in which the method is applied to the first terminal in FIG. 1. Referring to FIG. 3, the method specifically includes the following steps.

S302. Obtain a screenshot instruction for a target page.

The screenshot instruction is a computer-readable instruction for triggering a screenshot action. The specific target page of the screenshot instruction is an object on which the screenshot action is performed. The first terminal may trigger the screenshot instruction when detecting a designated trigger operation, or may periodically trigger the screenshot instruction, or may trigger the screenshot instruction when a specified spontaneous event occurs. The specific target page of the screenshot instruction may be a target page currently displayed when the screenshot instruction is triggered. The target page may be a web page or an application interface.

S304. Obtain, according to the screenshot instruction, a screenshot of an area currently displayed on the target page.

In some embodiments, after obtaining the screenshot instruction, in response to the screenshot instruction, the first terminal performs the screenshot action on the area currently displayed on the target page, to obtain the corresponding screenshot. The screenshot may be obtained by an application that is run on the first terminal and that is configured to render the target page, or may be obtained by an operating system on the first terminal. The area currently displayed on the target page may be displayed in a full screen, or may occupy a partial display area of a display screen of the first terminal.

S306. Cover the area currently displayed on the target page with the screenshot for display.

In some embodiments, the first terminal uses the screenshot of the area currently displayed on the target page as a floating layer to cover the target page for display, so that a change of an area displayed in a scrolling process of the target page is covered by the screenshot used as the floating layer.

S308. Change an area covered by the screenshot on the target page to a designated area on the target page.

In some embodiments, the size of the target page is greater than the size of the display screen of the first terminal. When there is no screenshot covering the area currently displayed on the target page, the target page is scrolled, and different areas of the target page may be presented. The designated area may be an area designated in advance, and may be, for example, a top portion of the of the target page. The initial screen area of the target page may be an area displayed right after the target page is loaded, and is usually located at the top portion of the target page.

In some embodiments, the first terminal scrolls the target page, so that the area that is of the target page and that is covered by the screenshot is changed from the area currently displayed on the target page to the designated area on the target page.

S310. Obtain a screenshot of the designated area.

In some embodiments, the first terminal may directly obtain, from a local central processing unit, data that is generated by the central processing unit and that is used to render the designated area of the target page, to form the screenshot of the designated area. The screenshot of the designated area may be in a binary data format, or may be in a picture format. The first terminal may locally save the screenshot of the designated area, or may share the screenshot of the designated area to a second terminal.

S312. Restore the target page to the area displayed before the target page is changed to the designated area.

In some embodiments, before performing S308, the first terminal records a location of the area currently displayed on the target page on the target page, so that after step S308 and step S310, in step S312, the target page is changed to an area represented by the recorded location, to restore the target page to the area displayed before the target page is changed to the designated area.

S314. Remove display of the screenshot displayed in the area covering the target page.

In some embodiments, the first terminal may adjust the transparency level of the screenshot displayed in the area covering the target page, so that the screenshot can be completely invisible, to remove display of the screenshot. Alternatively, the first terminal may directly remove the screenshot used as a floating layer, i.e., remove display of the screenshot. After removing display of the screenshot, the first terminal may release the screenshot from the internal memory.

In the screen capture method, after the screenshot instruction is triggered, the screenshot of the area currently displayed on the target page is captured automatically, and covers the target page for display. When the screenshot covers the target page, the target page is changed to capture the screenshot of the designated area, to remove display of the screenshot covering the target page after the screenshot is obtained. In any location of the target page, a user may trigger the screenshot instruction, to capture the screenshot of the designated area. However, for the user, the area displayed by the seen target page is not changed. This can avoid interference to normal use of a page by the user. Therefore, screenshot efficiency is increased, and interference to use of the page by the user is also avoided.

In one embodiment, step S302 specifically includes obtaining, by running a parent application program on an operating system, the screenshot instruction for the target page belonging to a sub-application program. The sub-application program is run in an environment provided by the parent application program.

Figure 4:
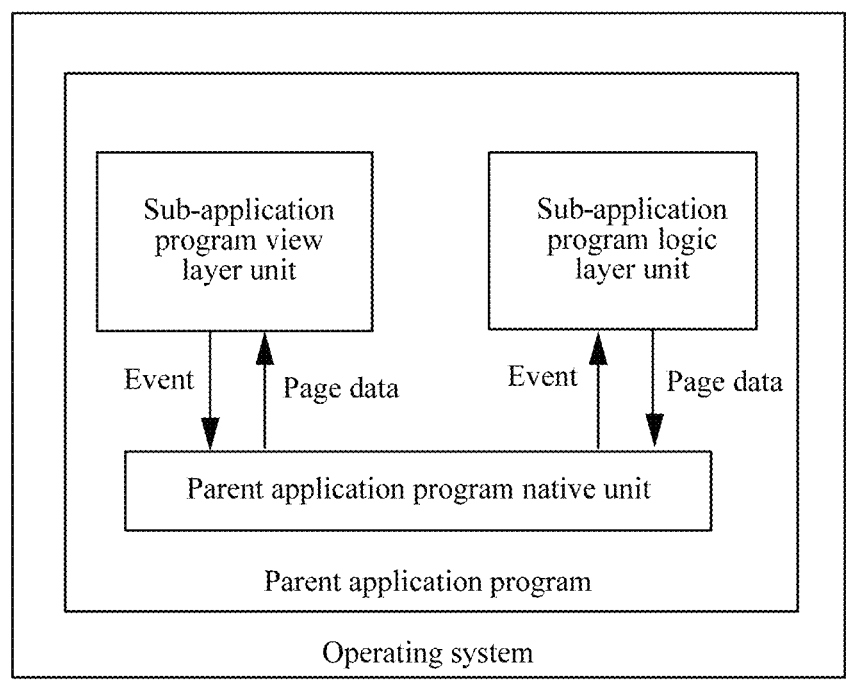
FIG. 4 is a schematic diagram of a relationship of an operating system, a parent application program, a sub-application program view layer unit, and a sub-application program logic layer unit according to an embodiment of the present disclosure.

Referring to FIG. 4, the operating system is run on the first terminal, and the parent application program is run on the operating system. The parent application program provides the environment for running of the sub-application program. After a package of the sub-application program is obtained, a sub-application program logic layer unit and a corresponding sub-application program view layer unit that are configured to implement the sub-application program are created according to the package. The sub-application program logic layer unit may be configured to execute logic code included in the package. The sub-application program view layer unit is configured to execute page structure code included in the package, and further execute page style code included in the package. In the present disclosure, the screenshot apparatus includes various units, and all or some of the units may be implemented by software, hardware, or a combination thereof. In some embodiments, a unit may be implemented by storing computer instructions on computer readable media and one or more processors. When the executed by the one or more processors, the computer instructions cause the one or more processors to perform the functions of the unit.

The operating system (OS) is a computer program for managing and controlling hardware and software resources of the terminal, and is the fundamental system software running on a terminal. An application program needs to be run under support of the operating system. The operating system may be a desktop operating system such as a Windows operating system, a Linux operating system, or a Mac OS (Apple's desktop operating system), or may be a mobile operating system such as an iOS (Apple's mobile terminal operating system) or an Android operating system.

The parent application program is an application program supporting the sub-application program, and may provide the environment for the sub-application program. The parent application program is a native application program. The native application program is an application program that can be run on the operating system. The parent application program may be a social networking application program, a dedicated application program specially supporting the sub-application program, a file management application program, an email application program, a game application program, or the like. The social networking application program includes an instant messaging application, an SNS (Social Network Service) application, a live streaming application, or the like. The sub-application program is an application program that can be implemented in the environment provided by the parent application program. The sub-application program may be a social networking application program, a file management application program, an email application program, a game application program, or the like.

The sub-application program logic layer unit and the corresponding sub-application program view layer unit are configured to implement an instance of the sub-application program. One sub-application program may be implemented by one sub-application program logic layer unit and at least one sub-application program view layer unit. The sub-application program view layer unit and a sub-application program page may be in a one-to-one correspondence.

The sub-application program view layer unit is configured to organize and render a view of the sub-application program. The sub-application program logic layer unit is configured to process data processing logic of the sub-application program and the corresponding sub-application program page. A unit may be specifically a process or a thread. For example, the sub-application program view layer unit is a sub-application program view layer thread, and the sub-application program logic layer unit is a sub-application program logic layer thread. The sub-application program logic layer unit may be run in a virtual machine. The sub-application program view layer unit and the sub-application program logic layer unit may transfer communication by using a parent application program native unit. The parent application program native unit is an interface for communication between the parent application program and the sub-application program. The parent application program native unit may be a thread or a process of the parent application program. Logic code that is of each sub-application program page and that belongs to the package may be registered by the sub-application program logic layer unit during start, and the registered logic code is executed when the logic code needs to be used to process data.

The first terminal may render a page by using the sub-application program view layer unit according to initial page data of the corresponding sub-application program page, and send back an initial render completion notification to the sub-application program logic layer unit. After receiving the initial render completion notification by using the sub-application program logic layer unit, the first terminal obtains page update data, and sends the page update data to the sub-application program view layer unit. The first terminal renders an updated part on the page again by using the sub-application program view layer unit according to the page update data.

In one embodiment, the sub-application program view layer unit may preload a common resource during start, so that after receiving initial page data of a page, the sub-application program view layer unit renders the page according to a common resource required for rendering the page and the initial page data of the page, and sends back an initial render completion notification to the sub-application program logic layer unit. The common resource is a resource shared by generation of different sub-application program pages, for example, a render engine, common page structure code, or common style data.

The page update data is data used for updating and rendering the page. The terminal may automatically generate the page update data by using the sub-application program logic layer unit according to automatic execution code defined in logic code of the page. Alternatively, after receiving an event sent by the sub-application program view layer unit, the terminal may respond to the event by using the sub-application program logic layer unit according to the logic code of the page, to generate the corresponding page update data.

The updated part is a part that is on the page and that needs to be changed, and may be a changed part compared with the page obtained through rendering according to the initial page data, or may be a changed part compared with a previous rendered page. In some embodiments, the terminal may perform rendering again by using the sub-application program view layer unit based on the page obtained through rendering according to the initial page data, or may perform rendering again based on the previous rendered page.

In one embodiment, the sub-application program page may be rendered according to a common component provided by the parent application program and the initial page data of the page. The common component is a component that is provided by the parent application program and that is shared by different sub-application programs, has a visual form, and is a unit constituting the sub-application program page. The common component may be uniquely identified by using a common component identifier. That the different sub-application programs share the common component may be specifically that a same common component is invoked simultaneously or at different moments. The common component may also be shared by the parent application program and the sub-application program.

In one embodiment, the parent application program is run on the operating system, the parent application program provides the environment for running of the sub-application program, and the sub-application program of the parent application program is run in the environment. The parent application program may provide a function for performing screenshot on each sub-application program page, to ensure that the screenshot function is applicable to each sub-application program. In addition, the sub-application program does not need to care the screenshot function, thereby reducing a size of a corresponding installation package.

In one embodiment, step S308 specifically includes: controlling the target page belonging to the sub-application program to scroll by using the parent application program, to change the area covered by the screenshot on the target page to the designated area on the target page. Step S312 specifically includes: controlling the target page belonging to the sub-application program to scroll by using the parent application program, to restore the target page to the area displayed before the target page is changed to the designated area.

In some embodiments, the first terminal may control the target page of the sub-application program to scroll by using the parent application program native unit, and does not need to control the target page of the sub-application program to scroll by using the sub-application program logic layer unit and the sub-application program view layer unit of the sub-application program. The target page of the sub-application program is controlled to scroll, to control change of the covered area of the target page, so that the area covered by the screenshot is changed to the designated area on the target page. The first terminal may further perform screenshot automatically on the designated area that is on the target page and that is currently covered by the screenshot.

Further, after obtaining the screenshot of the designated area, the first terminal may control the target page of the sub-application program again to scroll by using the parent application program native unit, to control change of the covered area of the target page, and change the area covered by the screenshot to an area consistent with the covering screenshot, so that the target page is restored to the area displayed before the target page is changed to the designated area.

In one embodiment, the parent application program may directly control the target page of the sub-application program to scroll, and does not need to indirectly control the target page by using the sub-application program, to ensure compatibility and stability of the screenshot function.

In one embodiment, after step S302, specifically after any step of step 302 to step S314, the screen capture method further includes: obtaining text content by using the parent application program. After step S310, specifically after any step of step S310 to step S314, the screen capture method further includes: sharing the text content and the screenshot of the designated area by using the parent application program.

In some embodiments, In one embodiment, the obtaining text content by using the parent application program includes: transferring a screenshot notification to the sub-application program by using the parent application program, and obtaining the text content sent back by the sub-application program in response to the screenshot notification.

The text content sent back by the sub-application program in response to the screenshot notification is content of a text form that the sub-application program intends to share when sharing the screenshot, for example, a theme name of content in the designated area or a written introduction. For example, clothing is presented in the designated area of the target page. The text content sent back by the sub-application program may be a combination of one or more of a brand name of the clothing, an introduction to the clothing, a size of the clothing, and a price of the clothing.

In one embodiment, the obtaining text content by using the parent application program includes: directly obtaining text content related to the sub-application program by using the parent application program. The text content related to the sub-application program may be specifically a name, a version number, other introduction information, or the like of the sub-application program.

Further, the first terminal shares the text content and the screenshot of the designated area by using the parent application program, and may specifically share the text content and the screenshot of the designated area to a personal page corresponding to a user identifier triggering the screenshot instruction, or may share the text content and the screenshot of the designated area to the second terminal corresponding to a target user identifier. After obtaining the shared screenshot and text content, the second terminal may splice and display the shared screenshot and text content as a message.

In one embodiment, the screenshot of the designated area and the corresponding text content can be shared together by using the parent application program, increasing an information amount transferred in a screenshot sharing behavior.

In one embodiment, after step S302, specifically after any step of step S302 to step S310, the screen capture method further includes: obtaining a target user identifier. After step S310, specifically after any step of step S310 to step S314, the screen capture method further includes: sharing the screenshot of the designated area to a terminal corresponding to the target user identifier.

The target user identifier is an identifier of a user receiving the shared screenshot. In some embodiments, after step S302, the first terminal may provide a user identifier set having a social relationship with the user identifier triggering the screenshot instruction, and obtain a selection instruction for the user identifier in the user identifier set, to use the specific user identifier of the selection instruction as the target user identifier.

Further, the first terminal may share the screenshot of the designated area to the terminal corresponding to the target user identifier through point-to-point connection such as Bluetooth connection, NFC (near field communication) connection, or wireless local area network direct connection between the terminals. Alternatively, the first terminal may send the screenshot of the designated area and the target user identifier to a server, and the server shares the screenshot of the designated area to the terminal corresponding to the target user identifier.

In one embodiment, the screenshot of the designated area of the target page may be obtained by using the obtained screenshot instruction, and the screenshot is shared to the terminal corresponding to the target user identifier, to provide a new path of sharing the content.

In one embodiment, after step S302, specifically after any step of step 302 to step S310, the screen capture method further includes: obtaining text content. After step S310, the screen capture method further includes sharing the text content to a terminal corresponding to a target user identifier, so that the terminal splices and displays text content and the screenshot of the designated area.

In some embodiments, the first terminal may transfer a screenshot notification to the sub-application program by using the parent application program, and obtain the text content sent back by the sub-application program in response to the screenshot notification. Alternatively, the first terminal may automatically obtain text content related to the sub-application program by using the parent application program. Alternatively, the first terminal may obtain the text content entered by the user.

Further, the first terminal may share the text content and the screenshot of the designated area together or separately to the second terminal corresponding to the target user identifier. After receiving the text content and the screenshot of the designated area, the second terminal may splice the text content and the screenshot of the designated area as a message for display.

The text content and the screenshot may be specifically spliced left and right, or spliced up and down. There may be a plurality of pieces of text content. The plurality of pieces of text content may be spliced with the screenshot of the designated area, for example, may be spliced up, medially, and down, spliced left, medially, and right, spliced left and right and then up and down, or spliced up and down and then left and right. The text content and the screenshot may be spliced to form a new picture, or may separately exist and is visually spliced as a whole.

In one embodiment, the second terminal may generate a text container having a height the same as that of the screenshot of the designated area. The text container is filled with the text content, and the text container and the screenshot of the designated area are spliced left and right and then displayed. In one embodiment, the second terminal may generate a text container having a width the same as that of the screenshot of the designated area. The text container is filled with the text content, and the text container and the screenshot of the designated area are spliced up and down and then displayed.

In one embodiment, the text content and the screenshot of the designated area are shared, and are spliced and displayed on the terminal corresponding to the target user identifier. More information amount than that of the screenshot may be displayed, to transfer richer information.

In one embodiment, the sharing the screenshot of the designated area to the terminal corresponding to the target user identifier includes: sending the screenshot of the designated area and the target user identifier to the server; obtaining a corresponding download address after the server stores the screenshot of the designated area, and sending the download address to the terminal corresponding to the target user identifier; and downloading, by using the terminal, the screenshot of the designated area from the server according to the download address.

In some embodiments, after the first terminal sends the screenshot of the designated area and the target user identifier to the server, the server may store the screenshot, to generate the download address of the screenshot. The first terminal may send the text content to the server through a message channel, and send the screenshot of the designated area to the server through a file transmission channel.

The server may fill a message body with the download address, and send the message body to the second terminal corresponding to the target user identifier. After receiving the message body, the second terminal extracts the download address from the message body, and downloads the screenshot of the designated area from the server according to the download address.

Further, after the first terminal sends the screenshot of the designated area, the text content, and the target user identifier to the server, the server may store the screenshot, to generate the download address of the screenshot. The server may fill a message body with the text content and the download address, and send the message body to the second terminal corresponding to the target user identifier in the message body. After receiving the message body, the second terminal extracts the download address from the message body, and downloads the screenshot of the designated area from the server according to the download address. The second terminal extracts the text content from the message body, to splice and display the text content and the downloaded screenshot.

In one embodiment, after the screenshot of the designated area is sent to the server, the server shares the download address of the screenshot to the terminal corresponding to the target user identifier, and the terminal proactively downloads the screenshot. Compared with direct transmission of the screenshot, transmission of the download address occupies less network resources, so that waste of network resources resulted from direct transmission of the screenshot can be avoided.

In one embodiment, after step S308, specifically after any step of step S308 to step S314, the screen capture method further includes: when a video playback control exists in the area currently displayed on the target page, obtaining a current video frame played by the video playback control. After step S310, specifically after any step of step S310 to step S314, the screen capture method further includes: replacing, according to a location of the video playback control in the designated area, a local area that is in the screenshot of the designated area and that corresponds to the location with the current video frame.

The video playback control is a control presenting video frames one by one, to form a consecutive video. The video playback control may specifically obtain the video frames from a graphics processing unit for playback. The first terminal may directly obtain the current video frame from the graphics processing unit.

In some embodiments, the first terminal may record the location of the video playback control in the designated area of the target page, so that after obtaining the current video frame, the first terminal replaces, according to the recorded location, a local area having a same size as that of a playback area of the video playback control in the designated area with the current video frame. If the playback area of the video playback control that is displayed in the designated area includes only a partial area, a partial video frame that is in the current video frame and that has a same size as that of the partial area is replaced. After the replacement, subsequent processing on the screenshot of the designated area is all performed on the replaced screenshot.

In one embodiment, when the video playback control exists in the area currently displayed on the target page, the screenshot of the designated area may also be captured. Failure in capturing content of a played video because the video is being played on the target page may be avoided.

Figure 5:
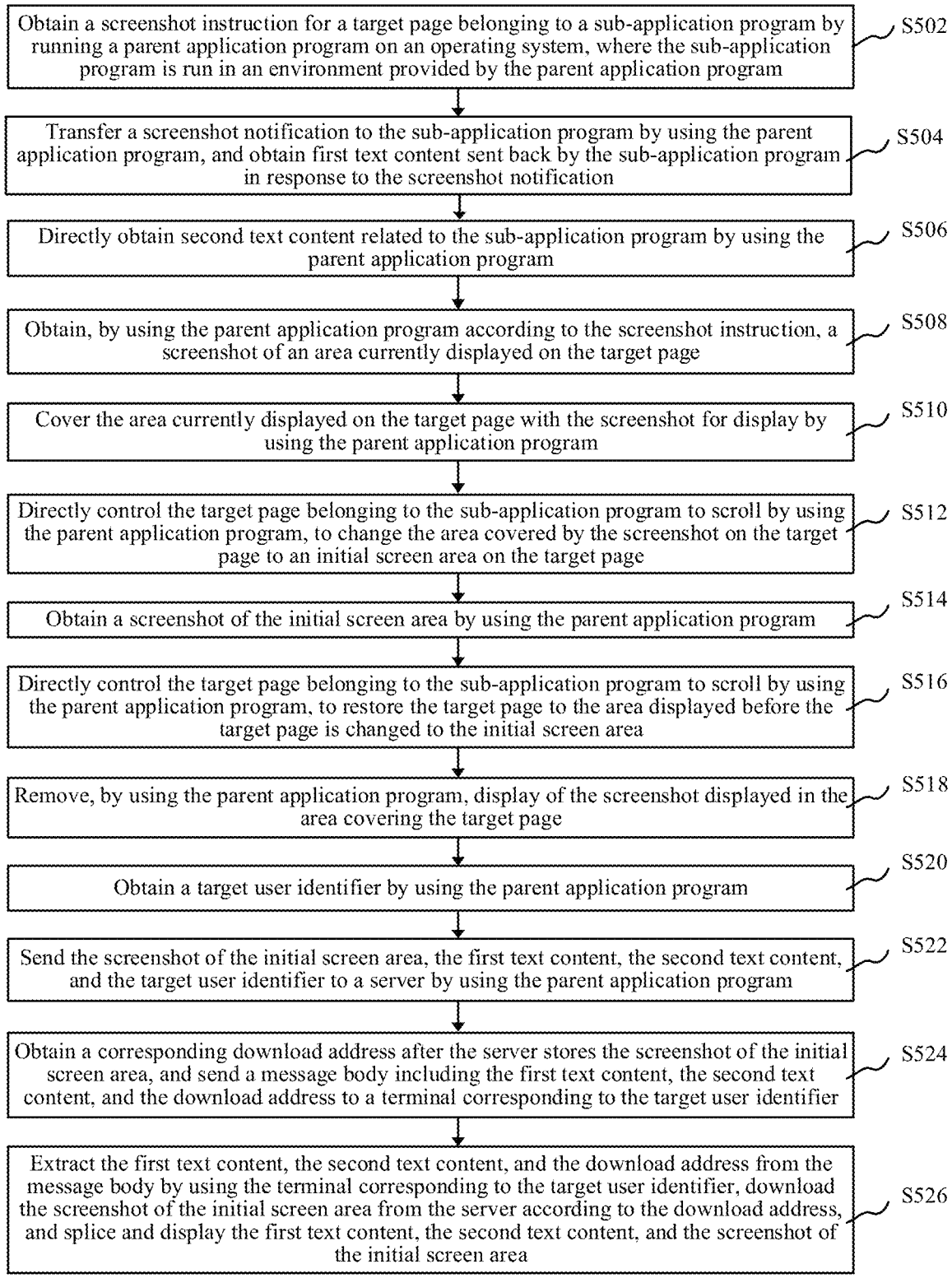
FIG. 5 is a schematic flowchart of a screen capture method according to another embodiment of the present disclosure.

Referring to FIG. 5, in one embodiment, a screen capture method specifically includes the following steps:

S502. Obtain a screenshot instruction for a target page belonging to a sub-application program by running a parent application program on an operating system. The sub-application program is run in an environment provided by the parent application program.

S504. Transfer a screenshot notification to the sub-application program by using the parent application program, and obtain first text content sent back by the sub-application program in response to the screenshot notification.

S506. Directly obtain second text content related to the sub-application program by using the parent application program.

S508. Obtain, by using the parent application program according to the screenshot instruction, a screenshot of an area currently displayed on the target page.

S510. Cover the area currently displayed on the target page with the screenshot for display by using the parent application program.

S512. Directly control the target page belonging to the sub-application program to scroll by using the parent application program, to change the area covered by the screenshot on the target page to an initial screen area on the target page.

S514. Obtain a screenshot of the initial screen area by using the parent application program.

S516. Directly control the target page belonging to the sub-application program to scroll by using the parent application program, to restore the target page to the area displayed before the target page is changed to the initial screen area.

S518. Remove, by using the parent application program, display of the screenshot displayed in the area covering the target page.

S520. Obtain a target user identifier by using the parent application program.

S522. Send the screenshot of the initial screen area, the first text content, the second text content, and the target user identifier to a server by using the parent application program.

S524. Obtain a corresponding download address after the server stores the screenshot of the initial screen area, and send a message body including the first text content, the second text content, and the download address to a terminal corresponding to the target user identifier.

Figure 6:
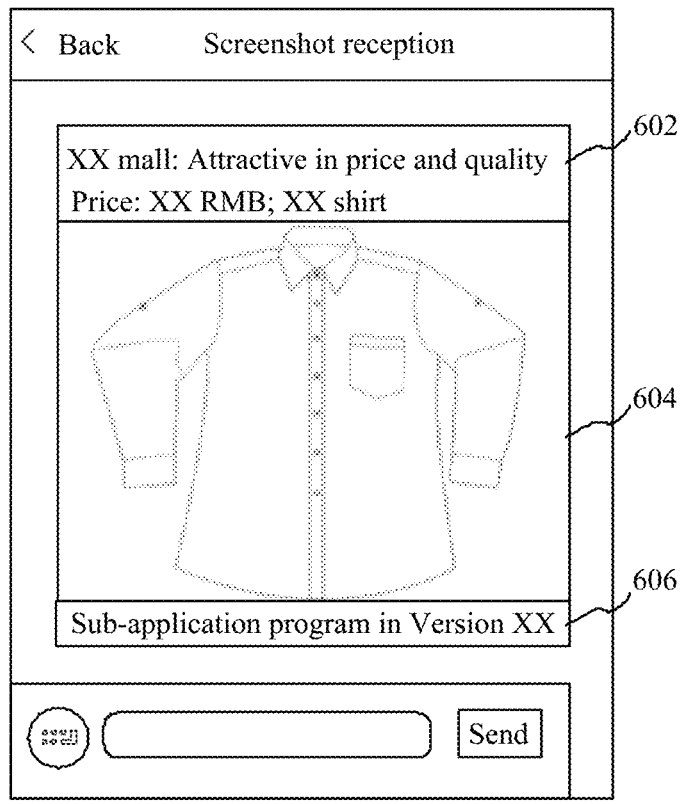
FIG. 6 is a schematic diagram of first text content, second text content, and a screenshot of a screen area that are spliced and displayed by a terminal corresponding to a target user identifier according to an embodiment of the present disclosure.

S526. Extract the first text content, the second text content, and the download address from the message body by using the terminal corresponding to the target user identifier, download the screenshot of the initial screen area from the server according to the download address, and splice and display the first text content, the second text content, and the screenshot of the initial screen area. For example, referring to FIG. 6, the terminal corresponding to the target user identifier may splice first text content 602, a screenshot 604 of an initial screen area, and second text content 606 up, medially, and down for display.

In the screen capture method, after the screenshot instruction is triggered, the screenshot of the area currently displayed on the target page is automatically captured, and covers the target page for display. When the screenshot covers the target page, the target page is changed to capture the screenshot of the designated area, to remove display of the screenshot covering the target page after the screenshot is obtained. In any location of the target page, a user may trigger the screenshot instruction, to capture the screenshot of the designated area. However, for the user, the area displayed by the seen target page is not changed. This can avoid interference to normal use of a page by the user. Therefore, screenshot efficiency is increased, and interference to use of the page by the user is also avoided.

In one embodiment, a terminal is further provided. An internal structure of the terminal may be shown in FIG. 2. The terminal includes a screenshot apparatus. The screenshot apparatus includes various modules, and all or some of the modules may be implemented by software, hardware, or a combination thereof. In some embodiments, a module may be implemented by storing computer instructions on computer readable media and one or more processors. When the executed by the one or more processors, the computer instructions cause the one or more processors to perform the functions of the module.

Figure 7:
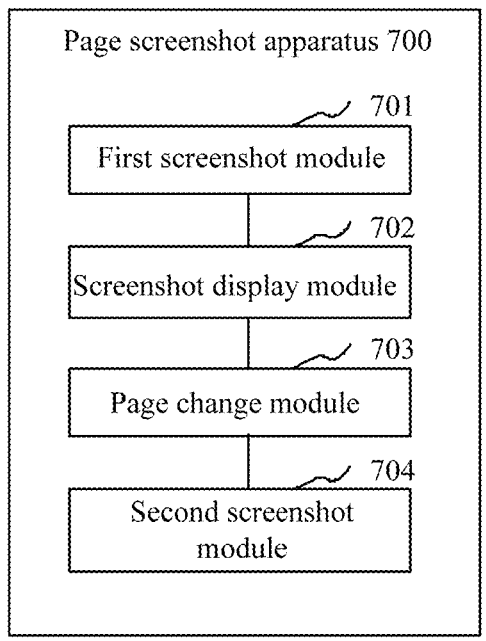
FIG. 7 is a structural block diagram of a screenshot apparatus according to an embodiment of the present disclosure.

FIG. 7 is a structural block diagram of a screenshot apparatus 700 according to another embodiment. Referring to FIG. 7, the screenshot apparatus 700 includes: a first screenshot module 701, a screenshot display module 702, a page change module 703, and a second screenshot module 704.

The first screenshot module 701 is configured to: obtain a screenshot instruction for a target page; and obtain, according to the screenshot instruction, a screenshot of an area currently displayed on the target page.

The screenshot display module 702 is configured to cover the area currently displayed on the target page with the screenshot for display.

The page change module 703 is configured to change an area covered by the screenshot on the target page to a designated area on the target page.

The second screenshot module 704 is configured to obtain a screenshot of the designated area.

The page change module 703 is further configured to: after the second screenshot module 704 obtains the screenshot of the designated area, restore the target page to an area displayed before the target page is changed to the designated area.

The screenshot display module 702 is further configured to: after the page change module 703 restores the target page to the area displayed before the target page is changed to the designated area, remove display of the screenshot covering the target page.

After triggering the screenshot instruction, the screenshot apparatus 700 directly captures the screenshot of the area currently displayed on the target page, and covers the target page for display; and when the screenshot covers the target page, changes the target page to capture the screenshot of the designated area, to remove display of the screenshot covering the target page after the screenshot is obtained. In any location of the target page, a user may trigger the screenshot instruction, to capture the screenshot of the designated area. However, for the user, the area displayed by the seen target page is not changed. This can avoid interference to normal use of a page by the user. Therefore, screenshot efficiency is increased, and interference to use of the page of the user is also avoided.

In one embodiment, the first screenshot module 701 is further configured to: obtain, by running a parent application program on an operating system, the screenshot instruction for the target page belonging to a sub-application program, where the sub-application program is run in an environment provided by the parent application program.

In one embodiment, the parent application program is running on the operating system, the parent application program provides the environment for running of the sub-application program, and the sub-application program of the parent application program is run in the environment. The parent application program may provide a function for performing screenshot on each sub-application program page, to ensure that the screenshot function is applicable to each sub-application program. In addition, the sub-application program does not need to care the screenshot function, thereby reducing a size of a corresponding installation package.

In one embodiment, the page change module 703 is further configured to directly control the target page belonging to the sub-application program to scroll by using the parent application program, to change the area covered by the screenshot on the target page to the designated area on the target page.

The page change module 703 is further configured to directly control the target page belonging to the sub-application program to scroll by using the parent application program, to restore the target page to the area displayed before the target page is changed to the designated area.

In one embodiment, the parent application program may directly control the target page of the sub-application program to scroll, and does not need to indirectly control the target page by using the sub-application program, to ensure compatibility and stability of the screenshot function.

Figure 8:
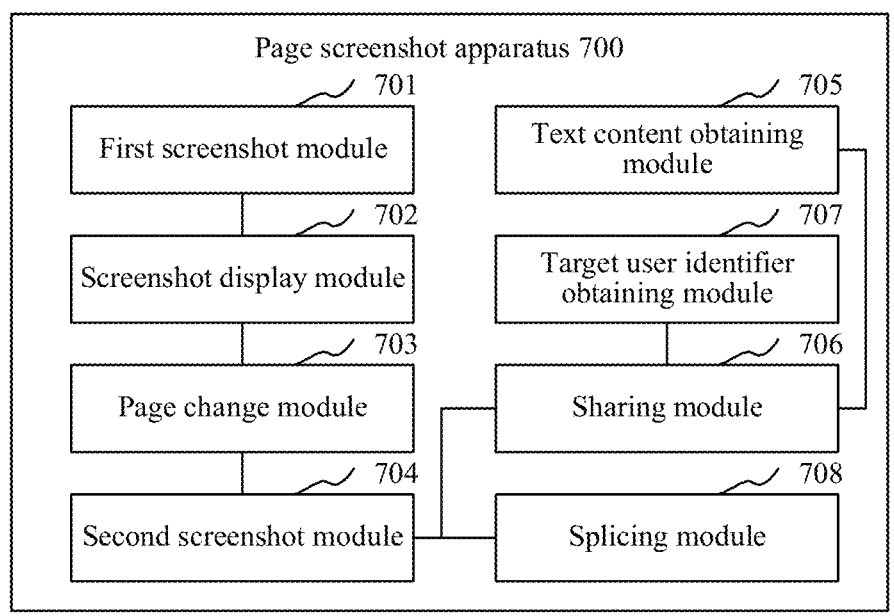
FIG. 8 is a structural block diagram of a screenshot apparatus according to another embodiment of the present disclosure.

FIG. 8 is a structural block diagram of the screenshot apparatus 700 according to another embodiment. Referring to FIG. 8, the screenshot apparatus 700 further includes a text content obtaining module 705 and a sharing module 706.

The text content obtaining module 705 is configured to obtain text content by using a parent application program.

The sharing module 706 is configured to share the text content and a screenshot of a designated area by using the parent application program.

In one embodiment, the screenshot of the designated area and the corresponding text content can be shared together by using the parent application program, increasing an information amount transferred in a screenshot sharing behavior.

In one embodiment, the text content obtaining module 705 is further configured to: transfer a screenshot notification to a sub-application program by using the parent application program, and obtain the text content sent back by the sub-application program in response to the screenshot notification; or, the text content obtaining module is further configured to directly obtain text content related to the sub-application program by using the parent application program.

In one embodiment, the screenshot apparatus 700 further includes a target user identifier obtaining module 707, configured to obtain a target user identifier. The sharing module 706 is further configured to share the screenshot of the designated area to a terminal corresponding to the target user identifier.

In one embodiment, the screenshot of the designated area of the target page may be obtained by using the obtained screenshot instruction, and the screenshot is shared to the terminal corresponding to the target user identifier, to provide a new path of sharing the content.

In one embodiment, the text content obtaining module 705 is configured to obtain the text content.

The sharing module 706 is further configured to share the text content to the terminal corresponding to the target user identifier, so that the terminal splices and displays the text content and the screenshot of the designated area.

In one embodiment, the text content and the screenshot of the designated area are shared, and are spliced and displayed on the terminal corresponding to the target user identifier. More information amount than that of the screenshot may be displayed, to transfer richer information.

In one embodiment, the sharing module 706 is further configured to send the screenshot of the designated area and the target user identifier to a server, so that the server stores the screenshot of the designated area to obtain a corresponding download address, and sends the download address to the terminal corresponding to the target user identifier. In addition, the terminal downloads the screenshot of the designated area from the server according to the download address.

In one embodiment, after the screenshot of the designated area is sent to the server, the server shares the download address of the screenshot to the terminal corresponding to the target user identifier, and the terminal proactively downloads the screenshot. Compared with direct transmission of the screenshot, transmission of the download address occupies less network resources, so that waste of network resources resulted from direct transmission of the screenshot can be avoided.

In one embodiment, the screenshot apparatus 700 further includes a splicing module 708, configured to: when a video playback control exists in the area currently displayed on the target page, obtain a current video frame played by the video playback control; and replace, according to a location of the video playback control in the designated area, a local area that is in the screenshot of the designated area and that corresponds to the location with the current video frame.

In one embodiment, when the video playback control exists in the area currently displayed on the target page, the screenshot of the designated area may also be normally captured, and failure in capturing content of a played video is avoided, where the failure is resulted from that the video is being played on the target page.

It should be understood that although the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRS-DRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), a memory bus dynamic RAM (RDRAM), and the like.

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments only describe several implementations of this application, which are described specifically and in detail, and therefore cannot be construed as a limitation to the patent scope of the present invention. It should be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A screen capture method, comprising:
receiving, by a first terminal, a screenshot instruction for a target page, a first area of the target page being displayed on a screen of the first terminal, wherein the screenshot instruction is obtained by a parent application program running on an operating system of the first terminal, wherein the screenshot instruction is for the target page belonging to a sub-application program, and wherein the sub-application program runs in an environment provided by the parent application program;
generating, by the first terminal, a screenshot of the first area of the target page according to the screenshot instruction
covering, by the first terminal, a portion of the screen with the screenshot of the first area;
scrolling, by the first terminal, the target page from the first area to a second area of the target page while having the screenshot of the first area displayed on the portion of the screen; and
generating, by the first terminal, a screenshot of the second area.

2. The method of claim 1, further comprising:
extracting, by the terminal, a text content corresponding to the second area of the target page; and
sending, by the terminal, to a server the text content along with the screenshot of the second area.

3. The method according to claim 1, further comprising:
adjusting a transparency level of the screenshot of the first area or the screenshot of the second area.

4. The method according to claim 1, further comprising:
configuring, by the first terminal, the screenshot of the first area as a floating layer.

5. The method according to claim 1, further comprising:
removing, by the first terminal, display of the screenshot of the first area.

6. The method of claim 1, wherein the first area of the target page includes a video playback control, the method further comprising:
obtaining, by the first terminal, a video frame displayed by the video playback control; and
placing, by the first terminal, the video frame in the second area of the urge target page.

7. The method of claim 1, further comprising:
restoring, by the first terminal, the target page to the first area displayed before the target page is scrolled to the second area.

8. A screen capture apparatus comprising: a memory; and a processor coupled to the memory, the processor being positioned to perform:
receiving a screenshot instruction for a target page, a first area of the target page being displayed on a screen of a first terminal, wherein the screenshot instruction is obtained by a parent application program running on an operating system of the first terminal, wherein the screenshot instruction is for the target page belonging to a sub-application program, and wherein the sub-application program runs in an environment provided by the parent application program;
generating a screenshot of the first area of the target page according to the screenshot instruction;
covering a portion of the screen with the screenshot of the first area;
scrolling the target page from the first area to a second area of the target page while having the screenshot of the first area displayed on the portion of the screen; and
generating a screenshot of the second area.

9. The screen capture apparatus of claim 8, wherein the processor is further positioned to perform:
extracting a text content corresponding to the second area of the target page; and sending to a server the text content along with the screenshot of the second area.

10. The screen capture apparatus of claim 8, wherein the processor is further positioned to perform:
adjusting a transparency level of the screenshot of the first area or the screenshot of the second area.

11. The screen capture apparatus of claim 8, wherein the processor is further positioned to perform:
configuring the screenshot of the first area as a floating layer.

12. The screen capture apparatus of claim 8, wherein the processor is further positioned to perform:
removing display of the screenshot of the first area.

13. The screen capture apparatus of claim 8, wherein the first area of the target page includes a video playback control, and wherein the processor is further positioned to perform:
obtaining a video frame displayed by the video playback control; and
placing the video frame in the second area of the target page.

14. The screen capture apparatus of claim 8, wherein the processor is further positioned to perform:
restoring the target page to the first area displayed before the target page is scrolled to the second area.

15. The screen capture apparatus of claim 8, wherein the first terminal includes the screen capture apparatus.

16. A non-transitory computer-readable storage medium storing computer program instructions executable by a processor to perform:
receiving, by a first terminal, a screenshot instruction for a target page, a first area of the target page being displayed on a screen of the first terminal, wherein the screenshot instruction is obtained by a parent application program running on an operating system of the first terminal, wherein the screenshot instruction is for the target page belonging to a sub-application program, and wherein the sub-application program runs in an environment provided by the parent application program;
generating, by the first terminal, a screenshot of the first area of the target page according to the screenshot instruction;
covering, by the first terminal, a portion of the screen with the screenshot of the first area;
scrolling, by the first terminal, the target page from the first area to a second area of the target page while having the screenshot of the first area displayed on the portion of the screen; and
generating, by the first terminal, a screenshot of the second area.

17. The non-transitory computer-readable storage medium of claim 16, wherein the computer program instructions are further executable by the processor to perform:
extracting, by the first terminal, a text content corresponding to the second area of the target page;
sending, by the first terminal, to a server the text content along with the screenshot of the second area.

18. The non-transitory computer-readable storage medium of claim 16, wherein the computer program instructions are further executable by the processor to perform:
adjusting, by the first terminal, a transparency level of the screenshot of the first area or the screenshot of the second area.

19. The non-transitory computer-readable storage medium of claim 16, wherein the computer program instructions are further executable by the processor to perform:
configuring, by the first terminal, the screenshot of the first area as a floating layer.

* * * * *